United States Patent
Iwasaki et al.

(10) Patent No.: US 10,915,301 B2
(45) Date of Patent: Feb. 9, 2021

(54) PROGRAMMING SUPPORT DEVICE, PROGRAMMING SUPPORT METHOD, AND NON-TRANSITORY RECORDING MEDIUM

(71) Applicant: CASIO COMPUTER CO., LTD., Tokyo (JP)

(72) Inventors: Shoichi Iwasaki, Fussa (JP); Akiko Muraki, Hamura (JP); Toshiaki Tanaka, Fussa (JP); Saki Tashiro, Musashino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 35 days.

(21) Appl. No.: 16/243,220

(22) Filed: Jan. 9, 2019

(65) Prior Publication Data
US 2019/0220254 A1 Jul. 18, 2019

(30) Foreign Application Priority Data

Jan. 12, 2018 (JP) .................................. 2018-003854

(51) Int. Cl.
*G06F 8/34* (2018.01)
*G06F 15/02* (2006.01)
*G06F 8/33* (2018.01)

(52) U.S. Cl.
CPC .................. *G06F 8/34* (2013.01); *G06F 8/33* (2013.01); *G06F 15/02* (2013.01); *G06F 15/0225* (2013.01)

(58) Field of Classification Search
CPC ........ G06F 15/02; G06F 15/0225; G06F 8/33; G06F 8/34
See application file for complete search history.

(56) References Cited

U.S. PATENT DOCUMENTS

| 8,024,385 B2* | 9/2011 | Karoji | G09B 19/025 708/130 |
| 2005/0268243 A1* | 12/2005 | Moser | G06F 9/45512 715/760 |
| 2013/0042197 A1* | 2/2013 | Amare | G09B 23/02 715/777 |

FOREIGN PATENT DOCUMENTS

JP S63-103354 A 5/1988

OTHER PUBLICATIONS

Anonymous, "The MicroPython Interactive Interpreter Mode (aka REPL)—MicroPython 1.6 documentation", Feb. 18, 2016, retrieved from the Internet: URL:https://web.archive.org/web/20160218200535/https://docs.micropython.org/en/latest/reference/repl.html [retrieved on Aug. 15, 2019], 5 pages.

(Continued)

*Primary Examiner* — Wei Y Zhen
*Assistant Examiner* — Amir Soltanzadeh
(74) *Attorney, Agent, or Firm* — Scully Scott Murphy & Presser

(57) ABSTRACT

According to one embodiment, there is provided a programming support device. The programming support device includes a display that displays a script input according to an operation and a processor that performs a process according to the script. When a line in which a first control script is displayed as the script is inserted in a screen displayed on the display, the processor performs a fetch process for at least one script, without a user's operation, between a line into which the first control script is inserted and a nearest blank line that is positioned on a line below the line into which the first control script is inserted, is a blank line in the same layer as the first control script, and is nearest to the line into which the first control script is inserted.

15 Claims, 9 Drawing Sheets

(56) References Cited

OTHER PUBLICATIONS

Texas Instruments, "TI-Basic Programming Guide for the TI-84 Plus CE Graphing Calculator", Jul. 12, 2016, retrieved from the Internet: URL:https://education.ti.com/-/media/377A0772C3B04D83B83D2A4E51029D08 [retrieved on Aug. 15, 2019], 64 pages.
European Search Report dated Aug. 23, 2019 in European Patent Application No. 19 15 1504.8.

\* cited by examiner

|   |                    |
|---|--------------------|
| 1 | Goto x=0, y=0  — Cu |
| 2 | Turn 10 degrees    |
| 3 | Pen Down           |
| 4 | Move 10            |

If R=0 — Insert →

$I_0\ I_1$ ↓↓

|   |                    |
|---|--------------------|
| 1 | If R=0  — Cu       |
| 2 | Goto x=0, y=0      |
| 3 | Turn 10 degrees    |
| 4 | Pen Down           |
| 5 | Move 10            |
| 6 | End                |

} Fetch

FIG. 11B $I_0$ ↓

|   |                    |
|---|--------------------|
| 1 | Goto x=0, y=0 — Cu |
| 2 | Turn 10 degrees    |
| 3 | Pen Down           |
| 4 | (Blank line I)     |
| 5 | Move 10            |

FIG. 12A

If R=0 — Insert →

$I_0\ I_1$ ↓↓

|   |                    |
|---|--------------------|
| 1 | If R=0             |
| 2 | Goto x=0, y=0 — Cu |
| 3 | Turn 10 degrees    |
| 4 | Pen Down           |
| 5 | End                |
| 6 | Move 10            |

} Fetch

FIG. 12B

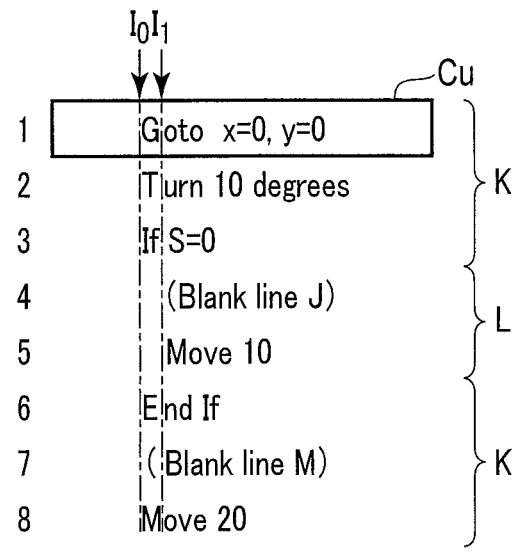
F I G. 13A
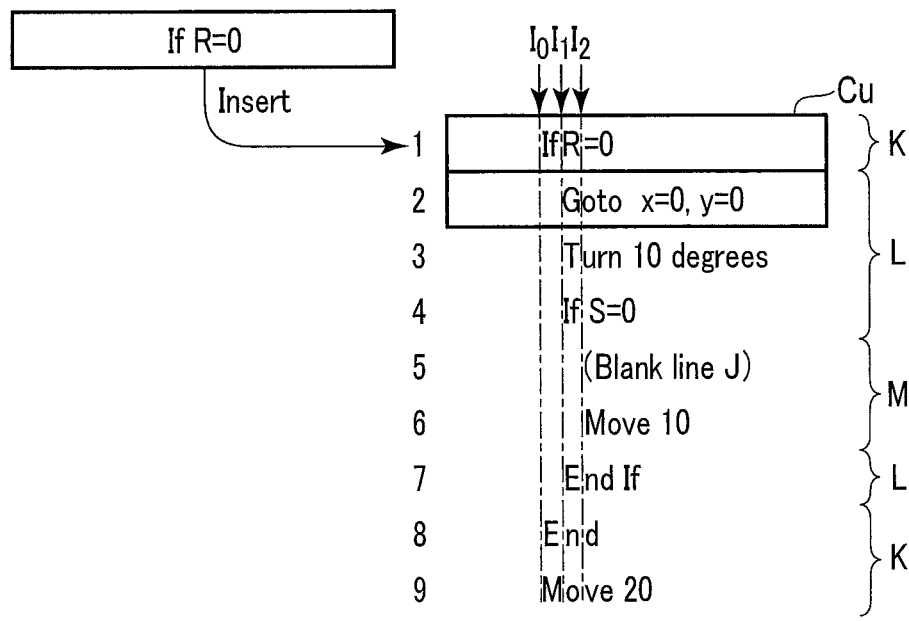
F I G. 13B

PROGRAMMING SUPPORT DEVICE, PROGRAMMING SUPPORT METHOD, AND NON-TRANSITORY RECORDING MEDIUM

CROSS-REFERENCE TO RELATED APPLICATION

This application is based upon and claims the benefit of priority from prior Japanese Patent Application No. 2018-3854, filed Jan. 12, 2018, the entire contents of which are incorporated herein by reference.

FIELD

The present invention relates to a programming support device for supporting programming by using an electronic device such as a graph function calculator, a programming support method, and a non-transitory recording medium.

BACKGROUND

As disclosed in Jpn. Pat. Appln. KOKAI Publication No. S63-103354, a graphic function calculator is a calculator that can draw graphs, calculate simultaneous equations, and perform calculations by using variables.

This type of the graph function calculator has a display and can display texts of a plurality of lines or graphs of calculation results from the display.

Since such a graph function calculator has a display, it has been recently considered to be used for programming education.

Assuming that the graph function calculator is used for programming education, it can be used for, for example, learning of algorithms.

In this case, for example, the graph function calculator may be configured to be switchable from a calculation mode for executing calculation to a mode for learning algorithms (hereinafter referred to as an "algorithm mode").

A program language environment for learning algorithms may include, for example, scratch.

The scratch can create a program list by freely arranging, on the display, lines on which scripts (source codes) are described (displayed), and can realize continuous operations by connecting a plurality of scripts.

In addition, among various scripts, for example, a control script (control source code that is one type of source codes) such as "Repeat" and "If" can create at least part of a program list by fetching a script of a control target therein.

In this case, the script to be fetched by the control script is not limited to a single script, but can be a plurality of successive scripts.

SUMMARY

However, when the graph function calculator is used for programming education, the following problems exist.

Generally, in the graph function calculator, the amount of information that can be displayed is limited due to the size of the display or the like.

Therefore, the graph function calculator has a configuration in which the lines in which the scripts are described (displayed) are arranged in one line.

Thus, when the control script is inserted later, importing is performed from the insertion position to the last script in the program list.

That is, a user may not be able to freely determine the script to be fetched by the control script, which causes inconvenience.

This problem can be an obstacle to the spread of the programming education using the graph function calculator.

The present invention was made in consideration of the above, and there is provided a programming support device, a programming support method, and a recording medium, which do not cause the user to suffer inconvenience, even in a case of programming in an electronic device wherein the amount of information that can be displayed is limited, for example, due to the size of a display.

In general, according to one embodiment, there is provided a programming support device. The programming support device includes a display that displays a script input according to an operation and a processor that performs a process according to the script. When a line in which a first control script is displayed as the script is inserted in a screen displayed on the display, the processor performs a fetch process for at least one script, without a user's operation, between a line into which the first control script is inserted and a nearest blank line that is positioned on a line below the line into which the first control script is inserted, is a blank line in the same layer as the first control script, and is nearest to the line into which the first control script is inserted.

The present invention can avoid possibilities of causing the user to suffer inconvenience.

BRIEF DESCRIPTION OF THE DRAWING(S)

FIG. 11A is a diagram illustrating an example of a program list for explaining a function of a script fetch subprogram;

FIG. 11B is a diagram illustrating an example of a program list for explaining a function of a script fetch subprogram;

FIG. 12A is a diagram illustrating an example of a program list for explaining a function of a script fetch subprogram;

FIG. 12B is a diagram illustrating an example of a program list for explaining a function of a script fetch subprogram;

FIG. 13A is a diagram illustrating a program list for explaining a function of a script fetch subprogram; and FIG. 13B is a diagram illustrating a program list for explaining a function of a script fetch subprogram.

DETAILED DESCRIPTION

Hereinafter, a programming support device to which a programming support method according to an embodiment of the present invention is applied will be described with reference to the drawings.

Figure 1:
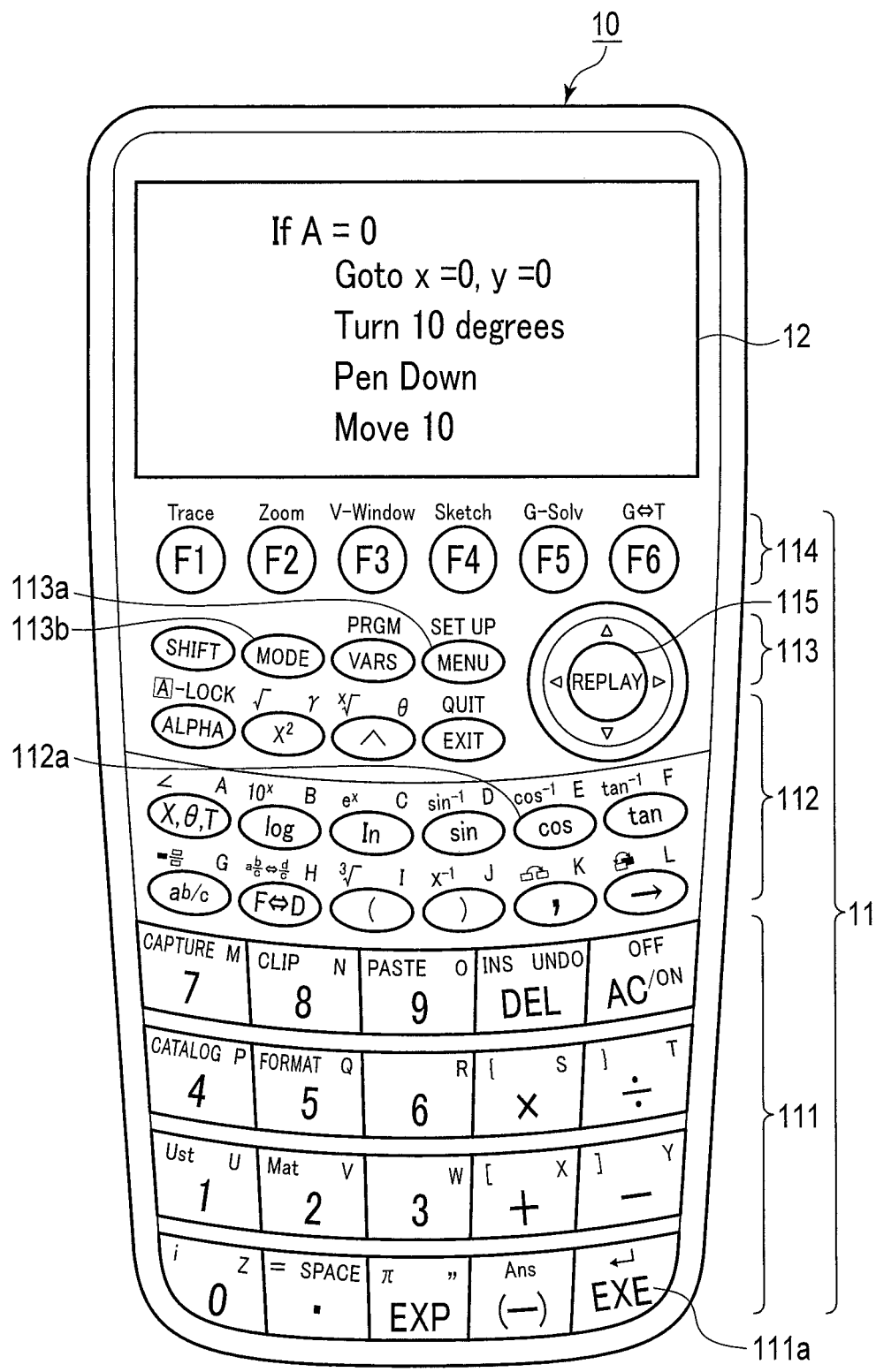
FIG. 1 is a front view illustrating an external configuration example of an electronic device mounted with a programming support device to which a programming support method according to an embodiment of the present invention is applied.

FIG. 1 is a front view illustrating an external configuration example of an electronic device 10 mounted with a programming support device to which a programming support method according to an embodiment of the present invention is applied.

FIG. 1 is a diagram illustrating a case in which the electronic device 10 is implemented as a graph function calculator.

However, the electronic device 10 is not limited to being configured as the graph function calculator, and can be configured as a tablet terminal, a personal computer, a smartphone, a mobile phone, touch panel type personal digital assistants (PDAs), an electronic book, a portable game machine, and the like.

As in a tablet terminal, in the case of an electronic device in which a physical key (button) such as a graph function calculator is not mounted, a software keyboard similar to the key of the graph function calculator may be displayed on a display and a process may be executed according to a key operation on the software keyboard.

The electronic device 10 configured as the graph function calculator is a small-size device which the user can grip sufficiently with one hand and can operate with one hand from the necessity of portability, and a keystroke unit 11 and a display 12 are provided on a front surface of a main body.

The keystroke unit 11 is configured to, for example, receive input of information about calculation, script (source code), and the like.

The keystroke unit 11 is provided with a numerical value/calculation symbol key group 111, a functional function key group 112, a setting key group 113, a function key group 114, and a cursor key 115. The setting key group 113 include a "MENU" (menu) key 113a, a "MODE" key 113b, and the like.

The keystroke unit 11 receives an input of a command for a numerical value, a mathematical expression, and a program instruction, and receives an input for instructing calculation or program execution.

The functional function key group 112 receives inputs of various functions and receives inputs for starting a memory function.

The "MENU" (menu) key 113a receives an input for displaying a menu screen of various operation modes such as a calculation mode or an algorithm mode.

The "MODE" key 113b receives an input for instructing setting of these operation modes.

The function key group 114 receives an input for activating various functions displayed along the lower end of the display 12 by one key operation.

The cursor key 115 receives an input for performing an operation of moving a cursor Cu displayed on the display 12 or an operation of selecting a data item, and the like.

In order to set the operation mode of the electronic device 10 to the algorithm mode, for example, a key such as the "MENU" key 113a in the setting key group 113 is used.

Specifically, when the "MENU" key 113a is pressed, for example, a plurality of icons (menus) corresponding to each mode such as the calculation mode or the algorithm mode are displayed on the display 12.

The user presses the cursor keys 115, as necessary, to move the cursor Cu on the display 12 to an icon corresponding to the algorithm mode, and further, presses a predetermined key (for example, a "cos" key 112a) of the keystroke unit 11. Therefore, it is possible to set the algorithm mode of the electronic device 10.

By selecting one of the plurality of icons displayed on the display 12, the user can set the mode corresponding to the selected icon, that is, a desired mode.

The setting of the electronic device 10 to the algorithm mode is not limited thereto, but may be performed by pressing, for example, the "MODE" key 113b of the setting key group 113.

Specifically, when the "MODE" key 113b is pressed, the electronic device 10 may be configured such that the calculation mode and the algorithm mode are alternately switched.

In addition, the electronic device 10 may have other modes. When the electronic device 10 has three or more modes, the electronic device 10 may be configured such that the modes are sequentially switched whenever the "MODE" key 113b is pressed.

Even with such a configuration, the user can set a desired mode from a plurality of modes.

The numerical value/calculation symbol key group 111 includes [0] to [9] (numerical value) keys, [+] [−] [x] [÷] (four arithmetic operation symbol) keys, an [EXE] (execute) key, an [AC] (clear) key, and the like.

The functional function key group 112 includes a [sin] (sine) key, a [cos] (cosine) key, a [tan] (tangent) key, and the like.

In addition to the [MENU] (menu) key 113a or the "MODE" (mode selection) key 113b, the setting key group 113 includes a [SHIFT] (shift) key and the like.

The function key group 114 includes [F1] to [F6] keys. These [F1] to [F6] keys are arranged on the keystroke unit 11. The function key group 114 may be omitted, and the functions assigned to the [F1] key to the [F6] key may be executed not by the keys of the function key group 114 but by the operation of other keys.

When various keys including the numerical value/calculation symbol key group 111, the functional function key group 112, the setting key group 113, and the function key group 114 are continuously operated after the [SHIFT] key is operated, it is possible to function as a key printed on the key (upward in FIG. 1), not the key function printed on the key top.

For example, when the [AC] key is operated after the [SHIFT] key operation (hereinafter referred to as a [SHIFT]+[AC] key), it functions as a [OFF] (power off) key.

A [SHIFT]+[MENU] key functions as a [SET UP] (setup) key, and a [SHIFT]+[F3] key functions as a [V-Window] (view window: instructing display of a drawing area setting screen) key.

The notation of the key function (key function at the normal time) written on the key top may be written around the key (for example, above the corresponding key in FIG. 1). For example, the notation of the key function at the normal time and the notation of the key function (SHIFT state key function) corresponding to the case in which the

[SHIFT] key is operated (in the case in which the [SHIFT] key is valid) may be written in different display formats around the corresponding key.

The display 12 is provided for displaying a script and has, for example, a dot matrix type liquid crystal display unit. In the case in which the electronic device 10 is a tablet terminal, the display 12 may be a liquid crystal display unit provided with a touch panel overlapped.

Figure 2:
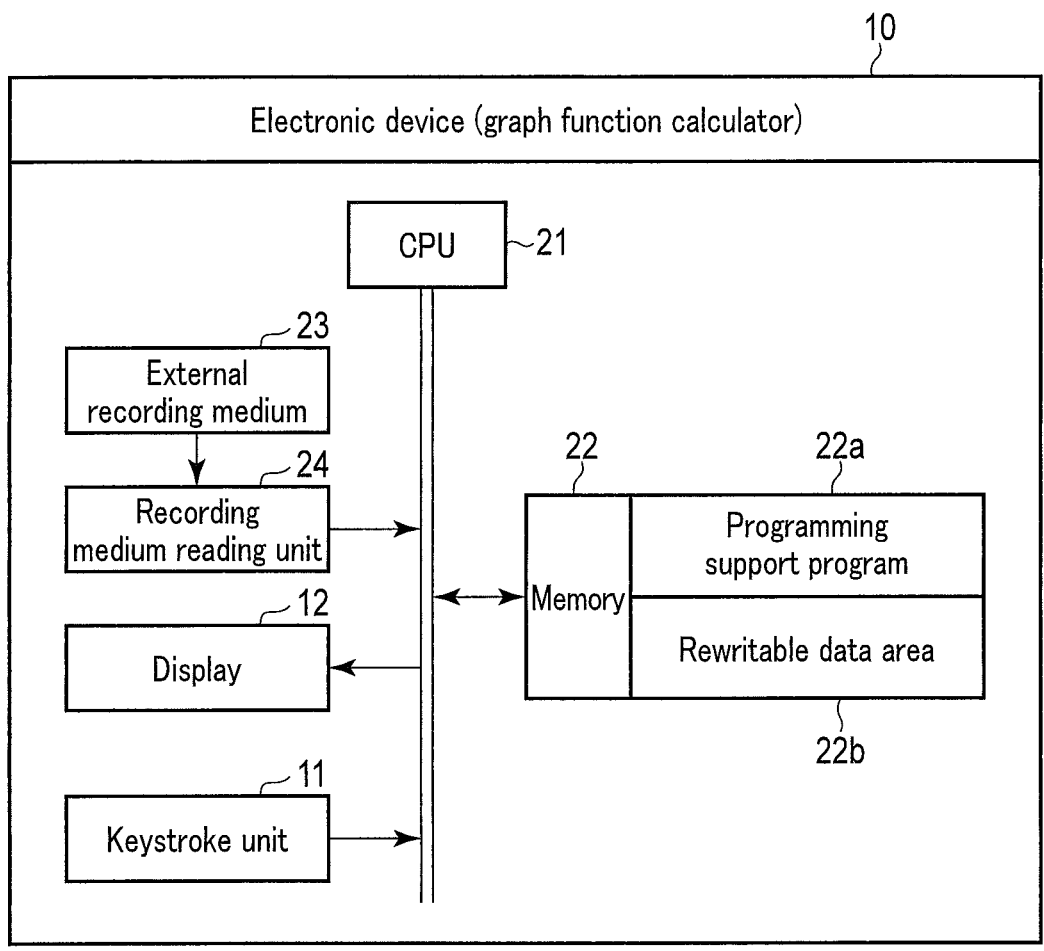
FIG. 2 is a block diagram illustrating a configuration example of an electronic circuit of an electronic device.

FIG. 2 is a block diagram illustrating a configuration example of an electronic circuit of the electronic device 10.

The electronic circuit of the electronic device 10 includes, in addition to the keystroke unit 11 and the display 12, a central processing unit (CPU) 21, a memory 22, and a recording-medium (non-transitory recording-medium) reading unit 24.

The CPU (processor) 21 controls the operation of each part of the circuit according to a programming support program 22a stored in the memory 22, and executes various processes according to a key input signal from the keystroke unit 11.

The programming support program 22a may be prestored in the memory 22, or may be read from an external recording medium 23, such as a memory card, through the recording-medium reading unit 24 and stored in the memory 22.

The programming support program 22a does not allow the user to rewrite the keystroke unit 11 by operation.

In addition to the information that is unrewritable by the user, the memory 22 has a rewritable data area 22b as an area for storing data rewritable by the user. Data of the key code that is key-input by the keystroke unit 11, data or table data of mathematical expressions constituted thereby, graph data, a program list created by the programming support program 22a, and the like are recorded in the rewritable data area 22b.

The program list is provided with one or more lines in which scripts are described (displayed).

When the programming support program 22a is started in a state in which the mode is set to the algorithm mode, the electronic device 10 configured as described above is in a state capable of receiving an input for creating a program list, such as an input for describing a script, from the numerical value/calculation symbol key group 111.

In addition, the CPU 21 controls the operation of each part of the circuit according to the instruction described in the programming support program 22a, and the software and the hardware operate in cooperation.

This realizes the programming support function as described below.

Figure 3:
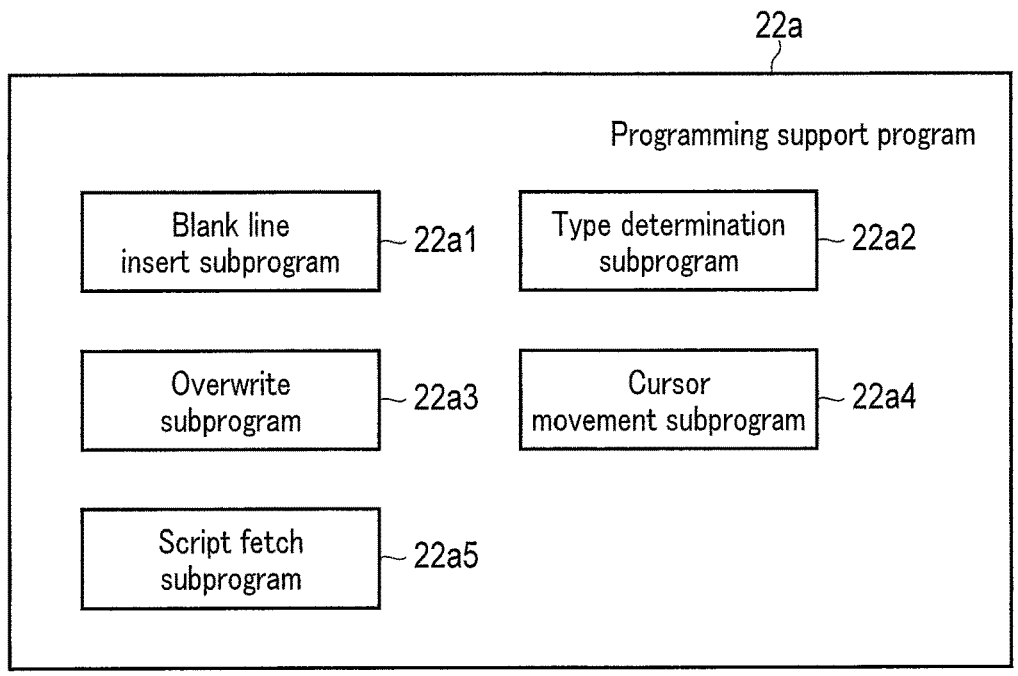
FIG. 3 is a configuration diagram illustrating an example of a subprogram included in a programming support program.

FIG. 3 is a configuration diagram illustrating an example of a subprogram included in the programming support program 22a.

For example, as in the graph function calculator, the programming support program 22a is a program for supporting the programming work by the user in the electronic device 10 in which the amount of information that can be displayed is limited due to the size of the display 12.

As illustrated in FIG. 3, the programming support program 22a includes a blank line insertion subprogram 22a1, a type determination subprogram 22a2, an overwrite subprogram 22a3, a cursor movement subprogram 22a4, and a script fetch subprogram 22a5.

The blank line insertion subprogram 22a1 is a program which inserts a blank line that is a script in which a script for execution is not described, such as a control script, a normal script, and a control end script, between the line spaces designated by the user, in the program list in which a script defined so as to perform a predetermined process is described in each line.

The "line space" used herein may include a position immediately above the first line constituting the program list or a position immediately below the last line constituting the program list. This blank line can be used, for example, to separate scripts before and after the insertion position of the blank line when inserted between the scripts.

The type determination subprogram 22a2 determines whether each line of the program list is a control script (control source code), whether each line of the program list is a normal script (normal source code), whether each line of the program list is a control end script (control end source code), whether each line of the program list is a program end script (program end source code), or whether each line of the program list is a blank line.

The control script is "If" or "Repeat", and the control end script is "End" that is a script corresponding to the control script.

The program end script is a script for ending the program and exists on the program list, but is not displayed on the display 12 of the electronic device 10.

The normal script is a script other than the control script, the control end script, the program end script, and the drawing script to be described later.

When the script of the discrimination target is the control script, the type determination subprogram 22a2 further determines whether the script is a three-line script accompanied by "Else."

The three-line script means a script written in three lines in which a line written in a script "If," a line written in a script "Else," and a line written in a script "End" are configured in this order.

When the program is executed by the CPU 21, the scripts described in each line of the program list are sequentially executed from the top line to the bottom line, but the line determined to be a blank line by the type determination subprogram 22a2 is skipped, and the line to be executed proceeds to the next line.

In contrast, in the line determined by the type determination subprogram 22a2 that the normal script, the control script, and the control end script are described, the process according to the described script is performed, and then the line to be executed proceeds to the next line.

In addition, in the line determined by the type determination subprogram 22a2 that the program end script is described, the execution of the program is ended.

As such, the flow of the process at the time of executing the program list (handling the scripts or the blank lines at the time of executing the program list), which is determined according to the determination result by the type determination subprogram 22a2, will be described with reference to a flowchart illustrated in FIG. 4.

Figure 4:
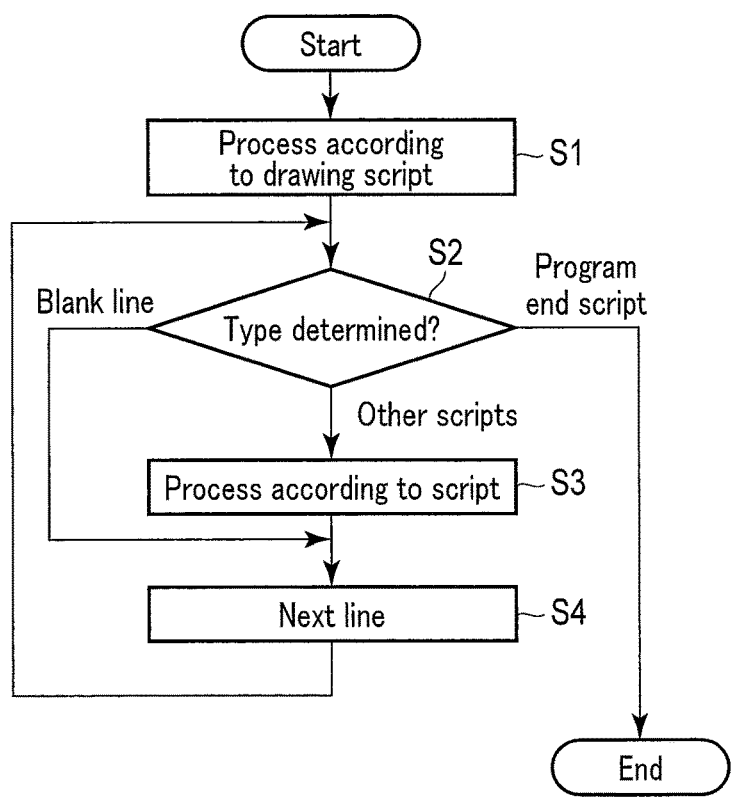
FIG. 4 is a flowchart illustrating an example of a flow of a process at the time of execution of a program list that is determined according to a type of a script.

As an example, the flowchart illustrated in FIG. 4 shows the flow of the program in which the drawing script is first processed, the axis or the background is drawn on the display 12 (S1), the line to be executed proceeds to the next line, and the process according to the script described in the line is executed (S2, S3, S4).

After the process is performed according to the drawing script (S1), when the line to be executed proceeds to the next line, the type determination subprogram 22a2 determines the type of the script described in the line (line to be newly executed) (S2).

In step S2, when the type determination subprogram 22a2 determines that the script described in the line to be newly executed is the program end script, the execution of the program is ended.

In contrast, in step S2, when the type determination subprogram 22a2 determines that the script described in the line to be newly executed is a script other than the program end script (one of the normal script, the control script, or the control end script), the process according to the script is executed (S3). After the process in step S3 is executed, the line to be executed proceeds to the next line (S4), and the flow returns to the process of step S2.

Furthermore, in step S2, when the type determination subprogram 22a2 determines that the line to be newly executed is a blank line, the line (blank line) is skipped, that is, nothing is executed, the line to be executed proceeds to the next line (S4), and the flow returns to the process of step S2.

As described above, since nothing is executed on the blank line, it can be used for separating scripts without being affected by the operation at the time of executing the program list.

On the other hand, the blank line can also be used for inserting a new script.

In order to realize this, the overwrite subprogram 22a3 provides a function of overwriting a script on a blank line.

Figure 5:
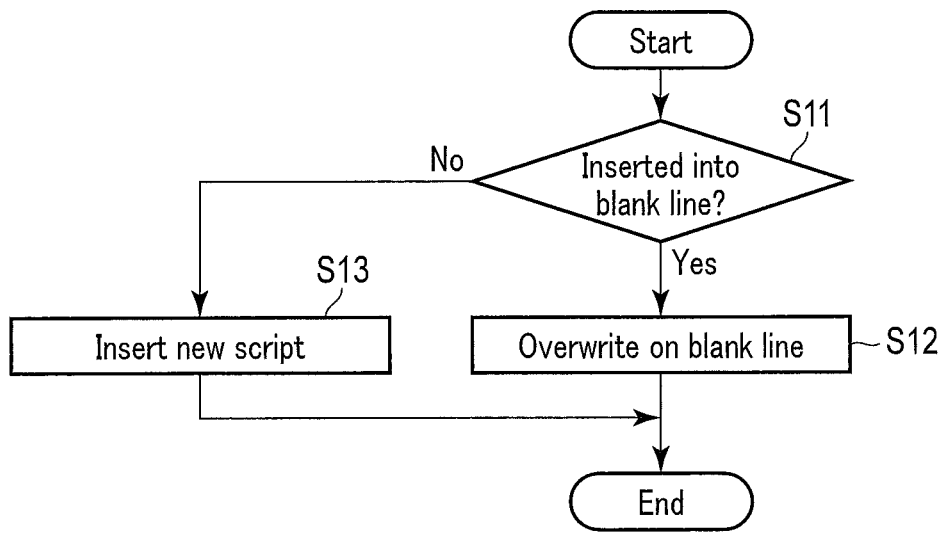
FIG. 5 is a flowchart illustrating an example of a flow of a process for inserting a new script.

FIG. 5 is a flowchart illustrating an example of a flow of a process for inserting a new script.

By using the overwrite subprogram 22a3, the new script can be inserted into the program list by overwriting the script on the blank line without separately inserting the new line, that is, by converting the blank line into the script.

This corresponds to steps S11 and S12 in FIG. 5.

Figure 6:
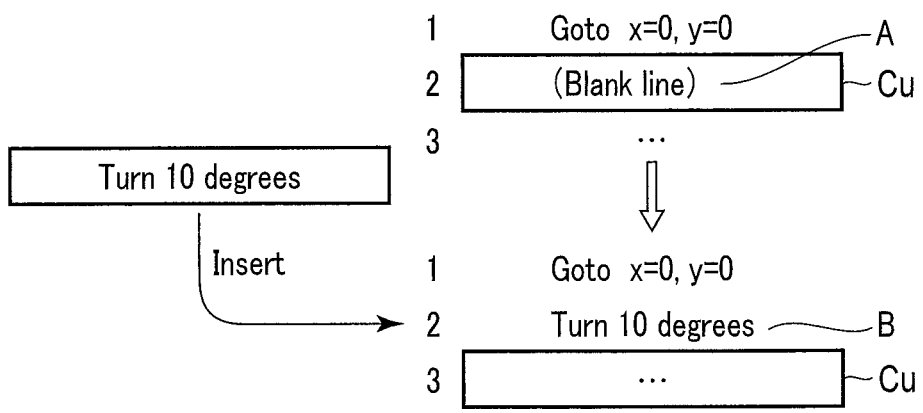
FIG. 6 is an explanatory diagram illustrating an example of inserting a new script by using a blank line.

For example, as illustrated in FIG. 6, a script B (for example, "Turn 10 degrees") is overwritten on a blank line A on the second line. In this manner, the new script B is generated (S12).

The blank line overwritten with the script is no longer the blank line.

Here, the cursor Cu that is on the second line written surrounding the script in the drawing is automatically moved to the third line.

The cursor Cu is not limited to display surrounding the script as long as the cursor Cu can be visually recognized. The entire script may be displayed with a color or hatching different from that of the line without the cursor.

On the other hand, the new script can be generated, without using the blank line, by inserting the new line above the position of the cursor Cu and writing the script in the line.

This corresponds to steps S11 and S13 in FIG. 5.

Figure 7:
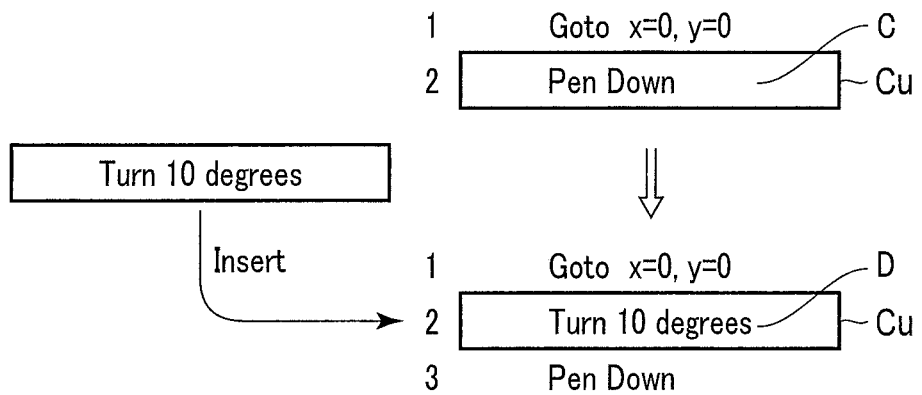
FIG. 7 is an explanatory diagram illustrating an example of inserting a new script without using a blank line.

For example, as illustrated in FIG. 7, the new line is inserted above the line C with the cursor Cu and script data (for example, "Turn 10 degrees") is written in the line to generate a new script D (S13).

Similarly, at this time, the cursor Cu is moved to the script D.

The cursor movement subprogram 22a4 is a program that jumps the cursor Cu from one blank line to the immediately preceding blank line or the immediately subsequent blank line with respect to one blank line.

The function of jumping the cursor Cu by the cursor movement subprogram 22a4 will be described with reference to a program list illustrated in FIG. 8.

Figure 8:
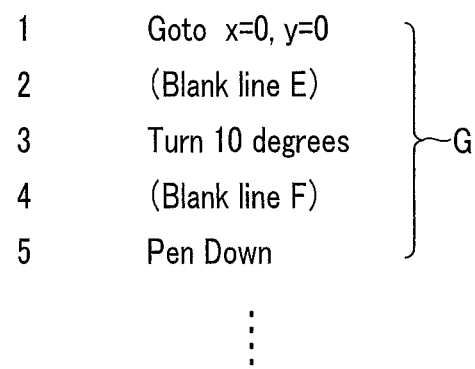
FIG. 8 is a diagram illustrating an example of a program list for explaining a function of a cursor moving subprogram.

FIG. 8 is a diagram illustrating a program list G. In the program list G, a script "Goto x=0, y=0" is described in the first line, the second line is a blank line E, a script "Turn 10 degrees" is described in the third line, the fourth line is a blank line F, and a script "Pen Down" is described in the fifth line.

When the display 12 can display only four-line script, it is impossible to simultaneously display beyond four successive lines among them. In FIG. 8, the position of the cursor Cu is not displayed.

In a state in which the program list G as illustrated in FIG. 8 is displayed from the display 12, in the case in which the cursor Cu is on the first line, when a "↓" key of the cursor key 115 is pressed, the cursor movement subprogram 22a4 functions so that the cursor Cu jumps to the second line with the immediately subsequent blank line E.

Furthermore, when the "↓" key is pressed from the time when the cursor Cu is on the second line, the cursor Cu jumps to the fourth line with the immediately subsequent blank line F.

When the "↓" key is pressed from the time when the cursor Cu is on the fourth line, if there is a blank line after the sixth line (not illustrated), the cursor Cu jumps to the immediately subsequent blank line.

If there are no blank lines in the subsequent lines, the cursor Cu does not move even if the "↓" key is pressed.

In contrast, when the "↑" key of the cursor key 115 is pressed, the cursor Cu jumps to the immediately preceding blank line.

For example, in the case in which the cursor Cu is on the fifth line, when the "↑" key is pressed, the cursor Cu jumps to the fourth line with the immediately preceding blank line F, and when the "↑" key is pressed again from there, the cursor Cu jumps to the second line with the immediately preceding blank line E.

Figure 9:
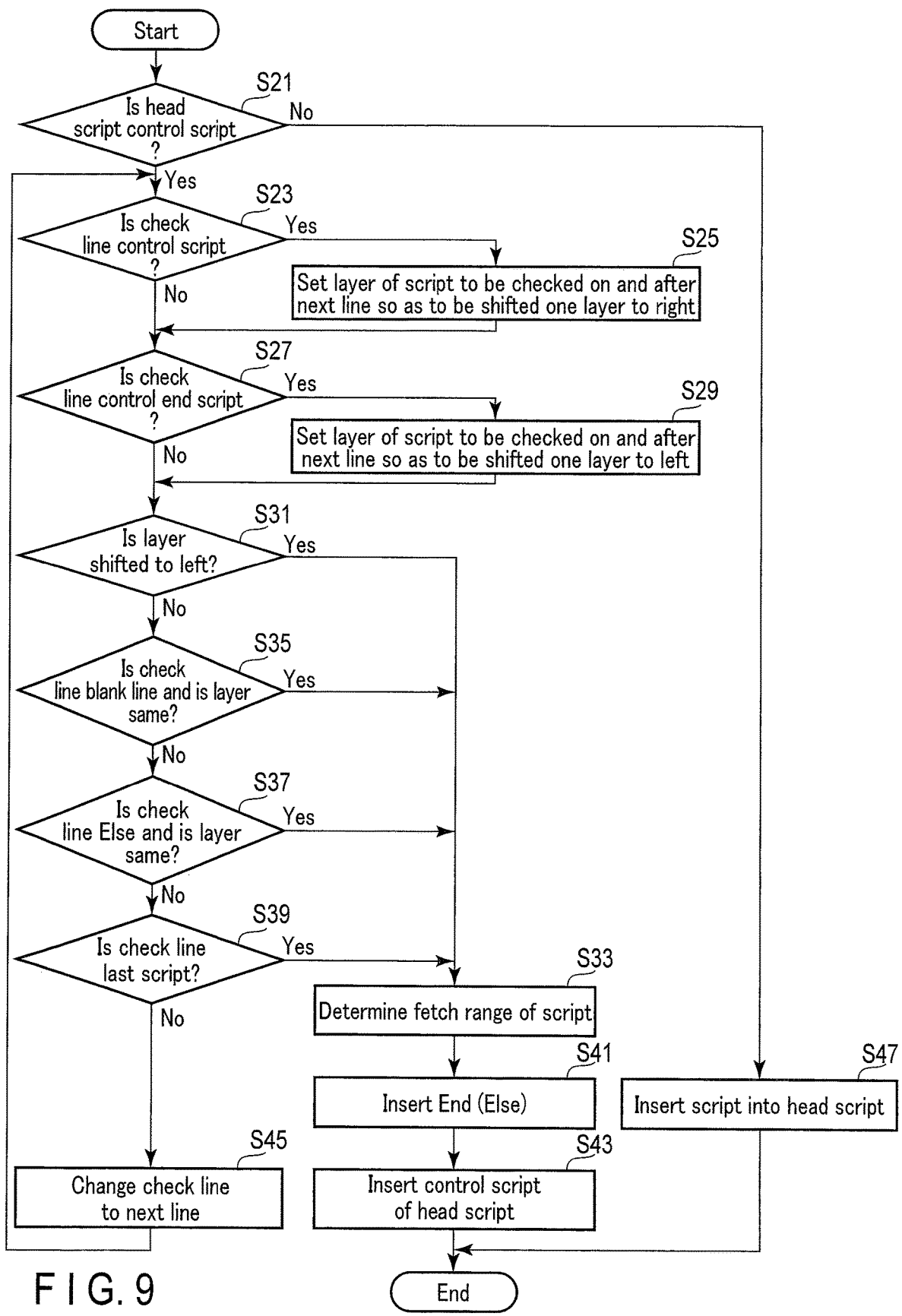
FIG. 9 is a flowchart for explaining an operation example of a script fetch subprogram.

The script fetch subprogram 22a5 is a program which, when the control script is inserted into the program list, fetches a script by checking the range of the script to be fetched and checking the script according to the flowchart illustrated in FIG. 9.

According to the user's operation, when entering an insertion script selection option mode, multiple options of multiple insertion scripts are displayed on the display 12 of the electronic device 10.

Next, when one of the options is selected by the user's operation, the process shifts to the start of FIG. 9.

In FIG. 9, it is indicated that the flow process after step S21 is performed, but the display on the display 12 is performed according to this flow process and the drawing flow described with reference to FIG. 10.

In addition, the flow in FIG. 9 is processed by the CPU 21. In the following description, an example of setting the position of the control end script corresponding to the control script according to the selected option will be mainly described.

First, in step S21, it is determined whether the head script based on the option selected in the insertion script selection option mode is the control script.

If it is determined that the head script is the control script (S21: Yes), the flow proceeds to step S23, and if it is determined that the head script is not the control script (S21: No), the flow proceeds to step S47.

After step S23, it is also a flow for determining appropriateness of a position of an insertion candidate of the control end script corresponding to the control script that is the head script.

Here, in step S23, it is determined whether there is the control script in the line (one line below the line in which the control script that is the head script is inserted) following the line in which the control script that is the head script to be inserted is described.

In step S23, if it is determined that there is the control script in the next line, that is, the currently checked line (S23: Yes), the layer of the script to be checked on and after the next line is set so as to be shifted one layer to the right of the current layer (S25), and the flow proceeds to step S27.

In contrast, if it is determined in step S23 that there is no control script in the currently checked line (S23: No), the process directly proceeds to step S27.

In step S27, if it is determined that there is the control end script in the currently checked line (S27: Yes), the layer of the script to be checked on and after the next line is set so as to be shifted one layer to the left of the current layer (S29), and the flow proceeds to step S31.

In contrast, if it is determined in step S27 that there is no control end script in the currently checked line in step S23 (S27: No), the process directly proceeds to step S31.

In step S31, if it is determined that the layer in the currently checked line is shifted to the left of the layer in the state immediately before the determination in step S23 is performed (S31: Yes), the flow proceeds to step S33.

In step S31, if it is determined that the layer in the currently checked line is not shifted to the left of the layer in the state immediately before the determination in step S23 is performed (S31: No), the flow proceeds to step S35.

In step S35, if it is determined that the currently checked line is the blank line and the layer in this line is the same as the layer in the state immediately before the determination in step S23 is performed (S35: Yes), the flow proceeds to step S33.

In step S35, if it is determined that the line to be current checked is the blank line and the layer in this line is not the same as the layer in the state immediately before the determination in step S23 is performed (S35: No), the flow proceeds to step S37.

In step S37, if it is determined that the script described in the currently checked line is "Else" and the layer in this line is the same as the layer in the state immediately before the determination in step S23 is performed (S37: Yes), the flow proceeds to step S33.

In step S37, if it is not determined that the script described in the currently checked line is "Else" and the layer in this line is the same as the layer in the state immediately before the determination in step S23 is performed (S37: No), the flow proceeds to step S39.

In step S39, if it is determined that the script described in the currently checked line is the program end script (S39: Yes), the flow proceeds to step S33.

In step S39, if it is determined that the script described in the currently checked line is not the program end script (S39: No), the process goes to step S45.

In step S45, the currently checked line (for example, the N-th line) is replaced with the line (for example, the (N+1)-th line) next to the currently checked line, and the process returns to step S23.

In step S33, the line from the next line in which the control script that is the head script to be inserted is described to the line above one line from the currently checked line is determined as the fetch range, the flow proceeds to step S41.

In step S41, when the script according to the option selected in the insertion script selection option mode is the three-line script, a line in which the script "Else" is described is inserted into the line that is above one line from the currently checked line. Next, a blank line is inserted under the line in which the script "Else" is described. Furthermore, a line in which the control end script "End" is described is inserted into the line below that. Then, the flow proceeds to step S43.

In addition, in step S41, the script according to the option selected in the insertion script selection option mode is not the three-line script, a line in which the control end script "End" is described is inserted into the line that is above one layer from the currently checked line, and the flow proceeds step S43.

In step S43, the line after the "currently checked line" to be checked in the first step S23 is shifted to the next lower line, the control script that is the head script according to the option selected in the insertion script selection option mode is inserted into the "currently checked line" vacated by this shift, and a series of steps is completed.

In step S47, the selected script is inserted into the line at the cursor position immediately before the selection in the insertion script selection option mode, and a series of steps is completed.

Figure 10:
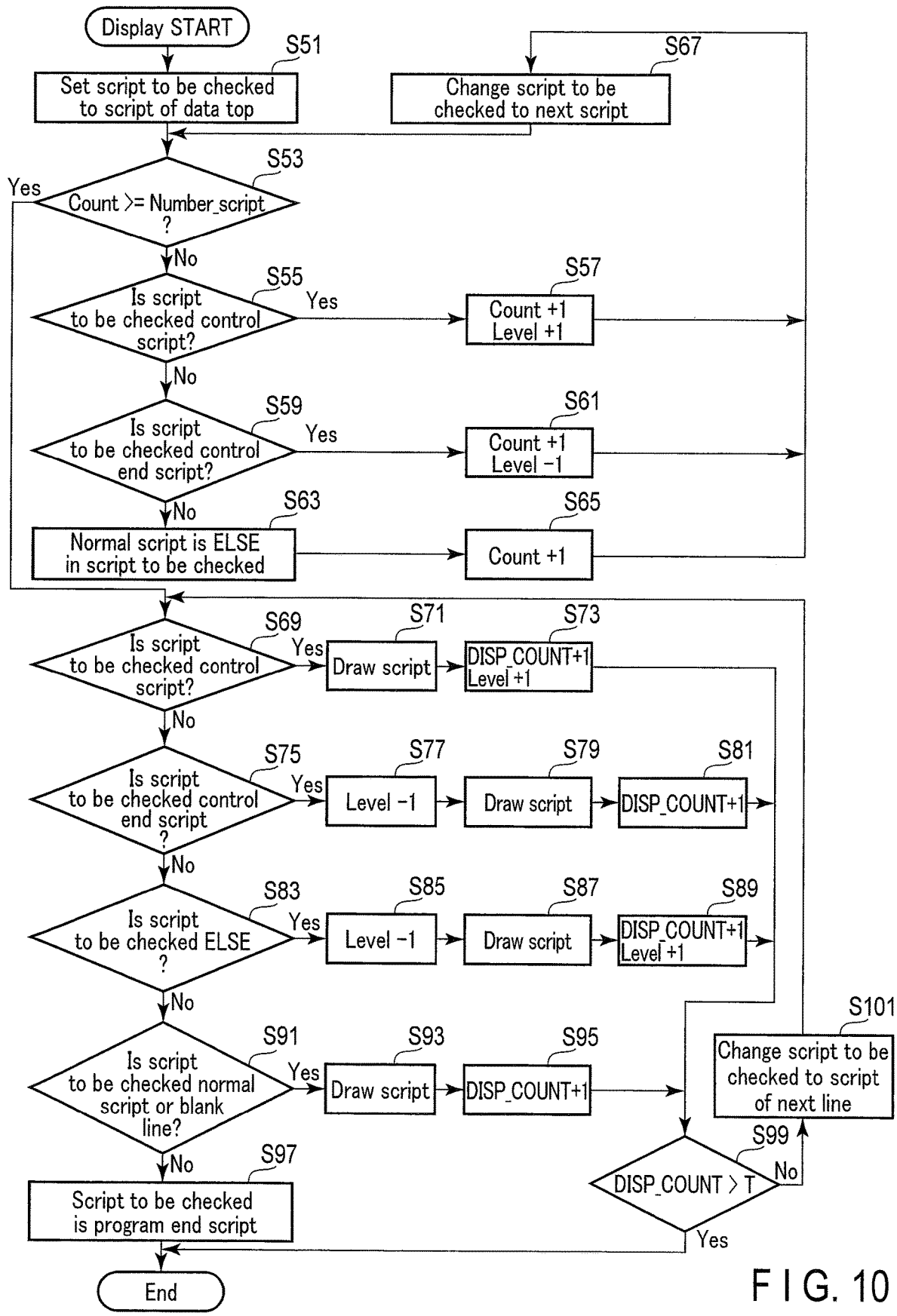
FIG. 10 is a flowchart for explaining an example of display of a fetched script.

After completion of the flow illustrated in FIG. 9, the flow proceeds to the flow illustrated in FIG. 10.

FIG. 10 is a flowchart illustrating the script at the position determined in FIG. 9, and the process is performed by the CPU 21.

Steps S51 to S67 are performed for locating a plurality of lines displayed on the display 12 of the electronic device 10.

In step S51, since the script to be checked is the script at the head of the data, the count value of the script to be checked becomes 1 as the initial value, and the flow proceeds to S53.

In step S53, when it is determined whether Number_script indicating at what number the script described on the top line displayed immediately before the beginning of the script insertion starts is located from the top of the entire program list on the display 12 of the electronic device 10 is less than or equal to the count value, if it is determined that Number_script is not less than or equal to the count value (S53: No), the flow proceeds to step S55, and if it is determined that Number_script is less than or equal to the count value (S53: Yes), the flow proceeds to step S69.

If the script to be checked is the program end script, the flow proceeds to step S69 when the determination in step S53 is Yes.

In step S55, it is determined whether the script to be checked is the control script. If it is determined that the script to be checked is the control script (S55: Yes), the flow proceeds to step S57, and i it is determined that the script to be checked is not the control script (S55: No), the flow proceeds to step S59.

In step S57, 1 is added to the count value, 1 is added to the value of the layer of the script to be displayed, and the flow proceeds to step S67.

In step S59, it is determined whether the script to be checked is the control end script. If it is determined that the script to be checked is the control end script (S59: Yes), the flow proceeds to step S61, and if it is determined that the script to be checked is not the control end script (S59: No), the flow proceeds to step S63.

In step S61, 1 is added to the count value, 1 is subtracted from the level value that is the value of the layer of the script to be displayed, and the flow proceeds to step S67.

In step S63, since the list to be checked is the normal script or Else, the flow proceeds to step S65, 1 is added to the count value in step S65, and the flow proceeds to step S67.

In step S67, the script to be checked is changed to the script described in the next line, and the flow returns to step S53.

In step S69, it is determined in step S53 whether the script to be checked described in the first line of the plurality of lines to be displayed on the display 12 of the electronic device 10 is the control script. If it is determined that the script to be checked is the control script (S69: Yes), the control script is displayed on the display 12 of the electronic device 10 (S71).

Subsequent to S71, in order to shift the next line in the line displayed on the display 12 of the electronic device 10 to the next line, 1 is added to DISP_COUNT (number of lines of script displayed in step S71), and furthermore, 1 is added to the level value that is the value of the current layer (S73), and the flow proceeds to step S99.

In contrast, if it is determined that the script to be checked is not the control script (S69: No), the flow proceeds to step S75.

In step S75, it is determined whether the script to be checked is the control end script. If it is determined that the script to be checked is the control end script (S75: Yes), 1 is subtracted from the level value that is the value of the current layer (S77), the control end script is displayed on the display 12 of the electronic device 10 (S79), 1 is added to DISP_COUNT (S81), and the flow proceeds to step S99.

In contrast, if it is determined that the script to be checked is not the control end script (S75: No), the flow proceeds to step S83.

In step S83, it is determined whether the script to be checked is Else. If it is determined that the script to be checked is Else (S83: Yes), 1 is subtracted from the level value that is the value of the current layer (S85), the Else is displayed on the display 12 of the electronic device 10 (S87), 1 is added to DISP_COUNT, 1 is added to the Level that is the value of the current layer (S89), and the flow proceeds to step S99.

In contrast, if it is determined that the script to be checked is not Else (S83: No), the flow proceeds to step S91.

In step S91, it is determined whether the script to be checked is the normal script or the blank line. If it is determined that the script to be checked is the normal script or the blank line (S91: Yes), the normal script or the blank line is displayed on the display 12 of the electronic device 10 (S93), 1 is added to DISP_COUNT, and the flow proceeds to step S99.

In contrast, if it is determined that the script to be checked is not the normal script or the blank line (S91: No), the flow proceeds to step S97.

In step S97, the script to be checked is regarded as the program end script, no new display is performed, and a series of processes is ended.

In step S99, it is determined whether DISP_COUNT exceeds T (T is a positive integer and is the maximum number of lines that can be displayed on the display 12 of the electronic device 10). If it is determined that DISP_COUNT exceeds T (S99: Yes), no new display is performed, and a series of processes is ended.

In contrast, if it is determined that DISP_COUNT does not exceed T (S99: No), the line on which the script to be checked is described is shifted to the next line (S101), and the process returns to step S69.

An example of fetching the control script performed by the script fetch subprogram 22*a*5 in this manner will be described with reference to a specific program list.

In the program list illustrated in FIG. 11A, scripts "Goto x=0, y=0," "Turn 10 degrees," "Pen Down," and "Move 10" are described in the same layer from the first line to the fourth line and there is no blank line.

When entering an insertion script selection option mode on such a program list according to the user's operation, options of a plurality of insertion scripts are displayed on the display 12 of the electronic device 10.

Next, when the insertion of one control script among the options is selected by the user's operation, the display of the program list disappears on the display 12 of the electronic device 10. For example, "If" that is the control script is displayed on the first line, ":A=0" is displayed on the second line, and "Then" is displayed on the third line.

Here, it is assumed that ":A=0" in the second line is rewritten to, for example, ":R=0" by the user's operation as necessary.

Then, "Goto x=0, y=0", "Turn 10 degrees", "Pen Down", and "Move 10" are fetched according to the flow illustrated in FIG. 9. Then, "End" that is the control end script is set at the position of the program end script that is not displayed at the lower part thereof.

When the "EXE" key 111*a* is input by the user's operation, the setting is confirmed, and first, the control script "If R=0" of the indentation position $I_0$ is displayed in the first line as illustrated in FIG. 11B.

Second, by inserting the control script "If R=0" to the first line, the normal script "Goto x=0, y=0" moved to the second line below the first line illustrated in FIG. 11A and moved from the indentation $I_0$ to the indentation position $I_1$ shifted one step to the right from the indentation position $I_0$ is displayed.

Third, the normal script "Turn 10 degrees" moved from the second line to the third line illustrated in FIG. 11A and moved from the indentation position $I_0$ to the indentation position $I_1$ is displayed.

Fourth, the normal script "Pen Down" moved from the third line to the fourth line illustrated in FIG. 11A and moved from the indentation position $I_0$ to the indentation position $I_1$ is displayed.

Fifth, the normal script "Move 10" moved from the fourth line to the fifth line illustrated in FIG. 11A and moved from the indentation position $I_0$ to the indentation position $I_1$ is displayed.

Sixth, the control end script "End" of the indentation position $I_0$ inserted into the sixth line illustrated in FIG. 11B is displayed.

The position of the cursor Cu is arranged on the line next to the line in which the inserted control script is described.

In contrast, in the program list illustrated in FIG. 12A, scripts "Goto x=0, y=0," "Turn 10 degrees," "Pen Down," the blank line I, and the script "Move 10" are described in the same layer from the first line to the fifth line in this order.

When entering an insertion script selection option mode on such a program list according to the user's operation, options of a plurality of insertion scripts are displayed on the display 12 of the electronic device 10.

Next, when the insertion of one control script among the options is selected by the user's operation, the display of the program list disappears on the display 12 of the electronic device 10. For example, "If" that is the control script is displayed on the first line, ":A=0" is displayed on the second line, and "Then" is displayed on the third line.

Here, it is assumed that ":A=0" in the second line is rewritten to, for example, ":R=0" by the user's operation as necessary.

After that, according to the flow illustrated in FIG. 9, up to the line that is above one blank line of the same layer as the control script is fetched, that is, "Goto x=0, y=0," "Turn 10 degrees," and "Pen Down" are fetched. Then, "End" that is the control end script corresponding to the inserted control script is substituted for the blank line at the bottom.

When the "EXE" key 111a is input by the user's operation, the setting is confirmed, and first, the control script "If R=0" of the indentation position $I_0$ is displayed in the first line as illustrated in FIG. 12B.

Second, by inserting the control script "If R=0" to the first line, the normal script "Goto x=0, y=0" moved to the second line below the first line illustrated in FIG. 12A and moved from the indentation $I_0$ to the indentation position $I_1$ shifted one step to the right from the indentation position $I_0$ is displayed.

Third, the normal script "Turn 10 degrees" moved from the second line to the third line illustrated in FIG. 12A and moved from the indentation position $I_0$ to the indentation position $I_1$ is displayed.

Fourth, the normal script "Pen Down" moved from the third line to the fourth line illustrated in FIG. 12A and moved from the indentation position $I_0$ to the indentation position $I_1$ is displayed.

Fifth, the control end script "End" of the indentation position $I_0$ corresponding to the control script of the first line is displayed while being inserted into the fifth line illustrated in FIG. 12B.

Sixth, in the normal script "Move 10" moved from the fifth line to the sixth line illustrated in FIG. 12A and disposed at the indentation position $I_0$ without being fetched, the number of lines that can be displayed on the display 12 of the electronic device 10 is displayed from the position according to the flow of FIG. 10. The position of the cursor Cu is arranged on the line next to the line in which the inserted control script is described.

In contrast, the program list illustrated in FIG. 13A is provided with two layers. The first to third lines and the sixth to eighth lines belong to the first layer K (corresponding to the indentation position $I_0$), and the fourth and fifth lines belong to the second layer L (corresponding to the indentation position $I_1$).

The second layer L is discriminated by indentation that is shifted one step to the right with respect to the first layer K (the indentation number is 1 larger).

Then, the fourth line belonging to the second layer L is a blank line J, and the seventh line belonging to the first layer K is a blank line M.

When entering an insertion script selection option mode on such a program list according to the user's operation, options of a plurality of insertion scripts are displayed on the display 12 of the electronic device 10.

Next, when the insertion of one control script among the options is selected by the user's operation, the display of the program list disappears on the display 12 of the electronic device 10. For example, "If" that is the control script is displayed on the first line, ":A=0" is displayed on the second line, and "Then" is displayed on the third line.

Here, it is assumed that ":A=0" in the second line is rewritten to, for example, ":R=0" by the user's operation as necessary.

After that, according to the flow illustrated in FIG. 9, up to the line that is above one blank line M of the same layer as the control script is fetched, that is, "Goto x=0, y=0," "Turn 10 degrees," "If S=0," the blank line J, "Move 10," and "End If" are fetched. Then, "End" that is the control end script corresponding to the inserted control script is substituted for the blank line M at the bottom.

When the "EXE" key 111a is input by the user's operation, the setting is confirmed, and first, the control script "If R=0" of the indentation position $I_0$ is displayed in the first line as illustrated in FIG. 13B.

Secondly, by inserting the control script "If R=0," the normal script "Goto x=0, y=0" moved to the second line below the first line illustrated in FIG. 13A and moved from the indentation $I_0$ to the indentation position $I_1$ shifted one step to the right from the indentation position $I_0$ is displayed.

Third, the normal script "Turn 10 degrees" moved from the second line to the third line illustrated in FIG. 13A and moved from the indentation position $I_0$ to the indentation position $I_1$ is displayed.

Fourth, the control script "If S=0" moved from the third line to the fourth line illustrated in FIG. 13A and moved from the indentation position $I_0$ to the indentation position $I_1$ is displayed.

Fifth, a blank line J moved from the fourth line to the fifth line illustrated in FIG. 13A and moved from the indentation position $I_1$ to the indentation position $I_2$ shifted one step to the right from the indentation position $I_1$ is displayed.

Sixth, the normal script "Move 10" moved from the fifth line to the sixth line illustrated in FIG. 13A and moved from the indentation position $I_1$ to the indentation position $I_2$ is displayed.

Seventh, the control script "End If" moved from the sixth line to the seventh line illustrated in FIG. 13A and moved from the indentation position $I_0$ to the indentation position $I_1$ is displayed.

Eighth, a script replacing a blank line M in the same layer as the control script moving from the seventh line to the eighth line illustrated in FIG. 13A, that is, the control end script "End" of the indentation position $I_0$ corresponding to the control script of the first line is displayed while being inserted into the eighth line.

Ninth, in the normal script "Move 20" moved from the eighth line to the ninth line illustrated in FIG. 13A and disposed at the indentation position $I_0$, the number of lines that can be displayed on the display 12 of the electronic device 10 is displayed from the position according to the flow of FIG. 10.

The position of the cursor Cu is arranged on the line next to the line in which the inserted control script is described.

As described above, according to the electronic device 10 mounted with the programming support device to which the programming support method according to the embodiment of the present invention is applied, the scripts can be separated by using the blank lines, without affecting the operation at the time of executing the program list.

Therefore, when the control script is inserted into the program list, it is possible to freely determine the fetch range of the control script according to the intention of the user, without fetching up to the last script of the program list as in the conventional art.

Furthermore, even when handling the three-line script as the control script, it is also possible for the user to easily select into which blank line "Else" or "End" that is the pair of scripts is to be inserted.

As described above, according to the present invention, even when programming is performed using the electronic device 10 in which the amount of information that can be displayed is limited due to the size of the display 12 or the like, it is possible to prevent the user from feeling inconvenient by separating the previous or next scripts, by performing selective pump, or by using the blank line that can be overwritten to create the new script.

The present invention is not limited to the embodiments, and various modifications can be made in the implementation stage without departing from the gist thereof. Furthermore, the embodiments include inventions of various stages, and various inventions can be extracted by appropriately combining the plurality of disclosed constitutional requirements. For example, even if some constituent requirements are deleted from all the constituent features shown in each embodiment or some constituent requirements are combined in a form different from each other, the configuration in which the constituent requirement is deleted or combined can be extracted as an invention when the problem described in the section of the problem to be solved by the invention can be solved and the effect described in the section of the effect of the invention is obtained.

The invention claimed is:

1. A programming support device comprising:
a processor configured to:
controlla display having a plurality of lines to display one or more scripts input according to an operation,
wherein the one or more scripts correspond to a process to be performed by the processor, and
wherein each of the one or more scripts is provided in one of a plurality of layers;
determine a line of the plurality of lines of the display into which a first control script is inserted;
determine a layer of the plurality of layers in which the first control script is provided; and
fetch, without a user's operation, at least one script, of the one or more scripts, between:
the line into which the first control script is inserted; and
a nearest blank line of the display, nearest to the line into which the first control script is inserted, among one or more blank lines that satisfy the conditions of being:
positioned on a line of the display below the line into which the first control script is inserted, and
a blank line of the display in the same layer of the plurality of layers as the first control script.

2. The programming support device according to claim 1, wherein the processor is configured to:
shift, without the user's operation, each of the at least one script fetched by one layer away from the layer in which the first control script is provided.

3. The programming support device according to claim 1, wherein the processor is configured to:
insert, without the user's operation, a control end script into the nearest blank line in the same layer of the plurality of layers as the first control script.

4. The programming support device according to claim 1, wherein the processor is configured to:
insert the first control script into the line of the plurality of lines of the display; and
in response to inserting the first control script into the line of the plurality lines of the display, move a script in the line into which the first control script is inserted to another line of the plurality of lines in between the line into which the first control script is inserted and the nearest blank line.

5. The programming support device according to claim 3, wherein the processor is configured to:
set a displayable line on the display based on the first control script, the one or more scripts fetched, and the control end script; and
control the display to display the displayable line.

6. The programming support device according to claim 5, wherein the processor is configured to:
set a cue of the first control script, the one or more scripts fetched and the control end script to be displayed on the display;

determine whether the displayable line amongst the cue is the control end script; and
in response to determining that the displayable line is the control end script:
set the displayable line by shifting the control end script by one layer toward the layer in which the first control script is provided; and
control the display to display the displayable line with the control end script shifted by the one layer toward the layer in which the first control script is provided.

7. The programming support device according to claim 5, wherein the processor is configured to:
set a cue of the first control script, the one or more scripts fetched and the control end script to be displayed on the display;
determine whether the displayable line amongst the cue is the first control script; and
in response to determining that the displayable line is the first control script control the display to display the displayable line with the first control script without any change of the layer in which the first control script is provided.

8. A programming support method performed by a processor of an electronic device, wherein the programming support method comprises:
controlling a display having a plurality of lines to display one or more scripts input according to an operation,
wherein the one or more scripts correspond to a process to be performed by the processor, and
wherein each of the one or more scripts is provided in one of a plurality of layers;
determining a line of the plurality of lines of the display into which a first control script is inserted;
determining a layer of the plurality of layers in which the first control script is provided; and
fetching, without a user's operation, at least one script, of the one or more scripts, between:
the line into which the first control script is inserted; and
a nearest blank line of the display, nearest to the line into which the first control script is inserted, among one or more blank lines that satisfy the conditions of being:
positioned on a line of the display below the line into which the first control script is inserted, and
a blank line of the display in the same layer of the plurality of layers as the first control script.

9. The programming support method according to claim 8, further comprising:
shifting, without the user's operation, each of the at least one script fetched by one layer away from the layer in which the first control script is provided.

10. The programming support method according to claim 8, further comprising:
inserting, without the user's operation, a control end script into the nearest blank line in the same layer of the plurality of layers as the first control script.

11. The programming support method according to claim 8, further comprising:
inserting the first control script into the line of the plurality of lines of the display; and
in response to inserting the first control script into the line of the plurality of lines of the display, moving a script in the line into which the first control script is inserted to another line of the plurality of lines in between the line into which the first control script is inserted and the nearest blank line.

12. The programming support method according to claim 10, further comprising:
setting a displayable line on the display based on the first control script, the one or more scripts fetched, and the control end script; and
controlling the display to display the displayable line.

13. The programming support method according to claim 12, further comprising:
setting a cue of the first control script, the one or more scripts fetched and the control end script to be displayed on the display;
determining whether the displayable line amongst the cue is the control end script; and
in response to determining that the displayable line is the control end script:
setting the displayable line by shifting the control end script by one layer toward the layer in which the first control script is provided; and
controlling the display to display the displayable line with the control end script shifted by the one layer toward the layer in which the first control script is provided.

14. The programming support method according to claim 12, further comprising:
setting a cue of the first control script, the one or more scripts fetched and the control end script to be displayed on the display;
determining whether the displayable line amongst the cue is the first control script; and
in response to determining that the displayable line is the first control script controlling the display to display the displayable line with the first control script without any change of the layer in which the first control script is provided.

15. A non-transitory computer-readable recording medium storing a computer program that controls a computer of an electronic device to at least perform:
controlling a display having a plurality of lines to display one or more scripts input according to an operation,
wherein the one or more scripts correspond to a process to be performed by the processor, and
wherein each of the one or more scripts is provided in one of a plurality of layers;
determining a line of the plurality of lines of the display into which a first control script is inserted;
determining a layer of the plurality of layers in which the first control script is provided; and
fetching, without a user's operation, at least one script, of the one or more scripts, between:
the line into which the first control script is inserted; and
a nearest blank line of the display, nearest to the line into which the first control script is inserted, among one or more blank lines that satisfy the conditions of being:
positioned on a line of the display below the line into which the first control script is inserted, and
a blank line of the display in the same layer of the plurality of layers as the first control script.

* * * * *